United States Patent
Shinmei et al.

(10) Patent No.: US 9,203,531 B1
(45) Date of Patent: Dec. 1, 2015

(54) WIRELESS CIRCUIT

(71) Applicant: SHARP KABUSHIKI KAISHA, Osaka-shi, Osaka (JP)

(72) Inventors: Hideaki Shinmei, Osaka (JP); Hiroki Kashiwagi, Osaka (JP); Shoichi Shitara, Osaka (JP); Kazuhiko Ikehata, Osaka (JP); Masamori Tokuda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/432,524

(22) PCT Filed: Sep. 26, 2013

(86) PCT No.: PCT/JP2013/076110
§ 371 (c)(1),
(2) Date: Mar. 31, 2015

(87) PCT Pub. No.: WO2014/057816
PCT Pub. Date: Apr. 17, 2014

(30) Foreign Application Priority Data

Oct. 9, 2012 (JP) ................. 2012-224234

(51) Int. Cl.
*H04B 17/10* (2015.01)
*H04B 1/04* (2006.01)

(52) U.S. Cl.
CPC ............ *H04B 17/101* (2015.01); *H04B 1/0475* (2013.01)

(58) Field of Classification Search
USPC .................. 375/297, 296, 260; 455/73, 553.1
See application file for complete search history.

(56) References Cited

U.S. PATENT DOCUMENTS

| | | | |
|---|---|---|---|
| 8,417,286 B2* | 4/2013 | Gorbachov | H04B 1/0064 455/552.1 |
| 8,463,199 B2* | 6/2013 | Sugar | H04B 1/005 455/272 |
| 2005/0245213 A1 | 11/2005 | Hirano et al. | |
| 2008/0219377 A1* | 9/2008 | Nisbet | H04B 1/525 375/296 |
| 2015/0207553 A1* | 7/2015 | Watanabe | H04B 7/0811 370/252 |

FOREIGN PATENT DOCUMENTS

| | | |
|---|---|---|
| EP | 1 085 662 A2 | 3/2001 |
| JP | 9-312578 A | 12/1997 |
| JP | 2001-86085 A | 3/2001 |
| JP | 2005-318212 A | 11/2005 |
| JP | 2006-80810 A | 3/2006 |
| JP | 2006-101096 A | 4/2006 |
| JP | 2006-295522 A | 10/2006 |
| JP | 2011-97320 A | 5/2011 |

* cited by examiner

*Primary Examiner* — Eva Puente
(74) *Attorney, Agent, or Firm* — Birch, Stewart, Kolasch & Birch, LLP

(57) ABSTRACT

A wireless circuit (100) which is capable of simultaneously outputting a plurality of transmission signals, including: a transmission signal selection circuit (31) which selectively outputs a detecting object signal out of a plurality of transmission signals; and a detection circuit (33) which detects a power of the detecting object signal thus outputted. This enables to provide, by use of a compact configuration, a technique for individually detecting transmission signals which are simultaneously generated by a respective plurality of transmission circuits.

5 Claims, 10 Drawing Sheets

WIRELESS CIRCUIT

TECHNICAL FIELD

The present invention relates to a wireless circuit.

BACKGROUND ART

Patent Literature 1 discloses a transmitter in which a detection circuit is shared by a plurality of transmission circuits that differ from each other in use frequency band.

With the use of a technique disclosed in Patent Literature 1, however, it is impossible to individually detect transmission signals which are simultaneously generated by a respective plurality of transmission circuits in order to carry out multi-carrier communication, a carrier aggregation, or the like.

According to a communication device disclosed in Patent Literature 2, on the other hand, when a detection circuit is provided for each frequency band, it is possible to detect each of levels of a respective plurality of transmission signals which are simultaneously generated.

CITATION LIST

Patent Literatures

Patent Literature 1
Japanese Patent Application Publication, Tokukai, No. 2011-97320 A (Publication Date: May 12, 2011)
Patent Literature 2
Japanese Patent Application Publication, Tokukai, No. 2005-318212 A (Publication Date: Nov. 10, 2005)

SUMMARY OF INVENTION

Technical Problem

However, a communication device disclosed in Patent Literature 2 includes a detection circuit for each frequency band, so that a circuit scale is increased. This causes (i) a problem with timing due to delay difference between wires, (ii) a crosstalk caused by parallel wires, and (iii) a necessity of matching adjustment caused by a change in layout.

The present invention has been made in view of the problems, and a primary object of the present invention is to provide, by use of a compact configuration, a technique for individually detecting powers of respective transmission signals which are simultaneously generated by a respective plurality of transmission circuits.

Solution to Problem

In order to attain the object, a wireless circuit in accordance with an aspect of the present invention is a wireless circuit which is capable of simultaneously outputting a plurality of transmission signals, including: a determination section which determines, out of a plurality of transmission signals that are simultaneously outputted by the wireless circuit, a detecting object signal whose transmission power is to be detected; a selection section to which the plurality of transmission signals are supplied and which selectively outputs the detecting object signal determined by the determination section; and a detection section which detects a power of the detecting object signal which has been outputted by the selection section.

Advantageous Effects of Invention

According to an aspect of the present invention, a detecting object signal whose transmission power is to be detected is selectively outputted out of a plurality of transmission signals which are simultaneously transmitted, and then the detecting object signal thus outputted is detected. Accordingly, it is possible to individually detect powers of the respective plurality of transmission signals without providing a detection section for each frequency band. That is, with the configuration, it is possible to provide, by use of a compact configuration, a technique for individually detecting transmission signals which are simultaneously generated by a respective plurality of transmission circuits.

DESCRIPTION OF EMBODIMENTS

Embodiment 1

The following description will discuss an embodiment (Embodiment 1) of the present invention with reference to the drawings. Note that a wireless circuit in accordance with Embodiment 1 is a wireless circuit for processing a transmission wave (transmission signal) and can be incorporated into a wireless device in general which receives/transmits or transmits, via an antenna, a carrier wave on which some signal is superimposed.

Figure 1:
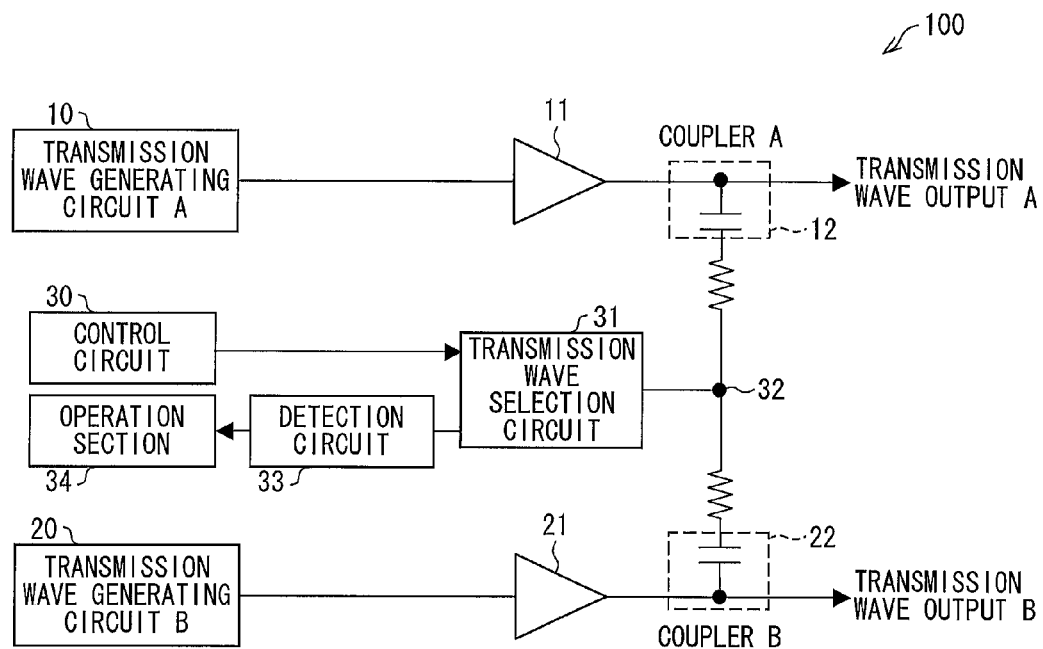
FIG. 1 is a block diagram illustrating a schematic configuration of a wireless circuit in accordance with an embodiment of the present invention.

FIG. 1 is a block diagram illustrating a schematic configuration of a wireless circuit 100 in accordance with Embodiment 1. As illustrated in FIG. 1, the wireless circuit 100 includes a transmission wave generating circuit A (transmission signal generating section) 10, an amplifier A (amplification section) 11, a coupler A12, a transmission wave generating circuit B (transmission signal generating section) 20, an amplifier B (amplification section) 21, a coupler B22, a control circuit (determination section) 30, a transmission wave selection circuit (selection section) 31, a detection circuit (detection section) 33, and an operation section 34.

Embodiment 1 will discuss a case where a transmission wave is detected in order to carry out feedback control with respect to a transmission power. Note, however, that the present invention is not limited to this, and is applicable to any case where a transmission wave needs to be detected.

As described above, the wireless circuit 100 (i) includes a plurality of transmission wave generating circuits (transmission wave generating circuit A10 and transmission wave generating circuit B20) and a plurality of amplifiers (amplifier A11 and amplifier B21) and (ii) is configured to simultaneously output a plurality of transmission waves (transmission waves A and B). Note that the plurality of transmission waves differ from each other in frequency band.

The wireless circuit 100 can, as needed, get into one of the following states (i) through (iii): (i) a state in which neither of the transmission wave A nor the transmission wave B is being transmitted; (ii) a state in which either the transmission wave A or the transmission wave B is being outputted; and (iii) a state in which the transmission wave A and the transmission wave B are simultaneously being outputted. Note that, unless otherwise stated, the following description will discuss the state in which the transmission wave A and the transmission wave B are simultaneously being outputted.

In the wireless circuit 100, a transmission wave A generated by the transmission wave generating circuit A10 (i) is amplified by the amplifier A11, (ii) is partially taken out by the coupler A12, and (iii) is then outputted (transmission wave output A).

Similarly, a transmission wave B generated by the transmission wave generating circuit B20 (i) is amplified by the amplifier B21, (ii) is partially taken out by the coupler B22, and (iii) is then outputted (transmission wave output B).

The transmission wave A and the transmission wave B thus taken out by the coupler A12 and the coupler B22, respectively, are coupled to each other by a coupling section 32 and are then supplied to the transmission wave selection circuit 31.

Note that (i) a loading resistor can be provided between the coupler A12 and the coupling section 32 and (ii) a loading resistor can be provided between the coupler B22 and the coupling section 32. With the configuration, (i) the transmission wave A taken out by the coupler A12 and (ii) the transmission wave B taken out by the coupler B22 are attenuated. This allows the transmission wave outputs B and A to be prevented from being affected by the transmission wave outputs A and B, respectively.

The control circuit 30 (i) determines, from the transmission wave A and the transmission wave B, a detecting object wave (detecting object signal) whose power is to be detected and then (ii) supplies, to the transmission wave selection circuit 31, a control signal (detection control signal) which specifies the detecting object wave thus determined.

From an input signal (input signal) in which the transmission wave A and the transmission wave B are coupled to each other, the transmission wave selection circuit 31 selectively supplies, to the detection circuit 33, a detecting object wave specified by the control signal.

The detection circuit 33 is, for example, a well-known DC-DC converter and can detect a power of the detecting object wave thus supplied. The detection circuit 33 then supplies, to the operation section 34, a signal indicative of the power of the detecting object wave thus detected.

The operation section 34 obtains information on the power of the detecting object wave from the signal thus supplied and then carries out feedback control with respect to a transmission power (control of amplifier) in accordance with the information on the power.

Figure 7:
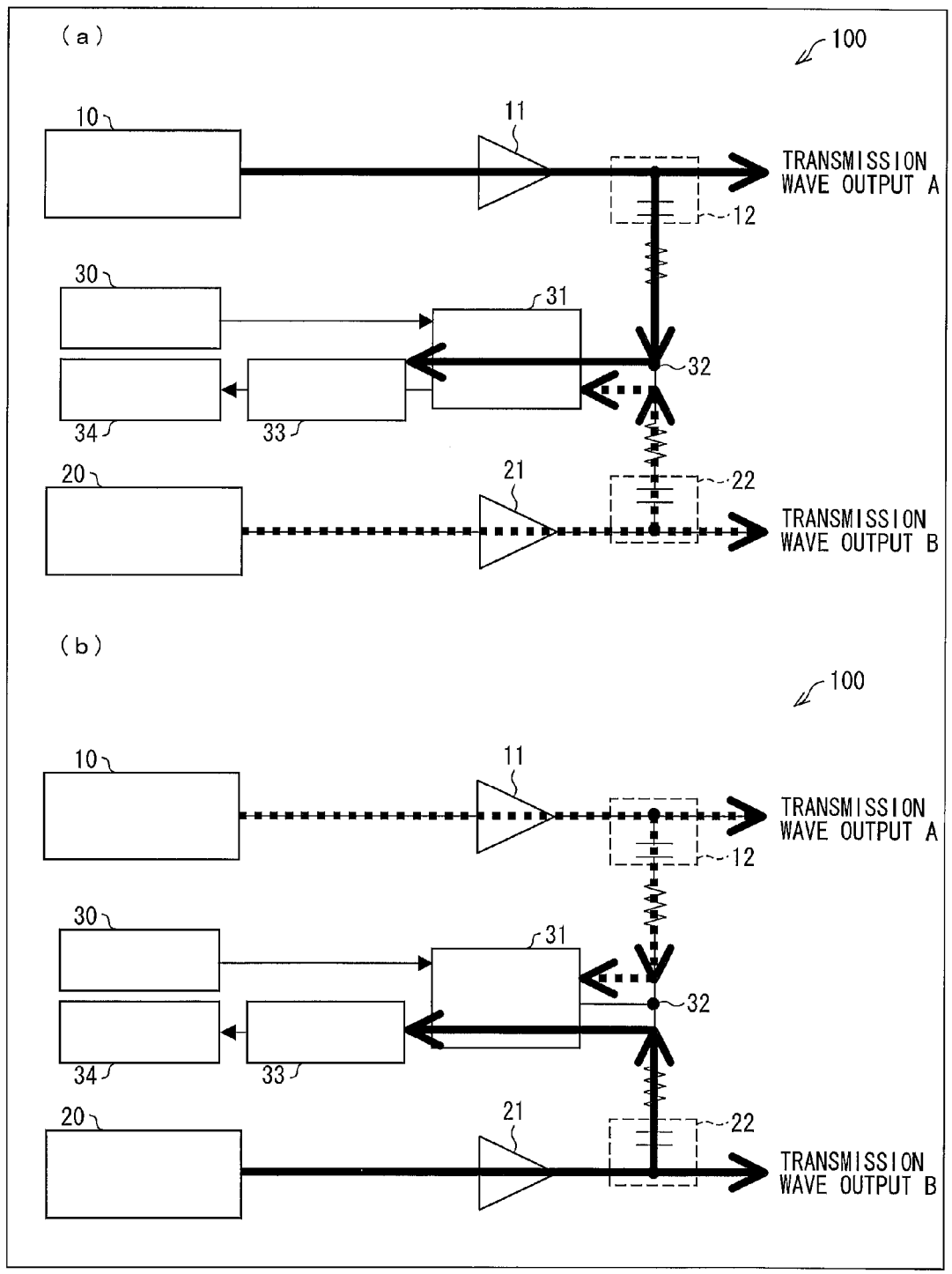
FIG. 7 is a view illustrating a flow of each transmission wave in a wireless circuit in accordance with an embodiment of the present invention.

FIG. 7 is a view illustrating a flow of each transmission wave in the wireless circuit 100. (a) of FIG. 7 illustrates a case where the detecting object wave is the transmission wave A, in (i) a state in which the transmission wave A and the transmission wave B are simultaneously being outputted or (ii) a state in which only the transmission wave A is being transmitted. (b) of FIG. 7 illustrates a case where the detecting object wave is the transmission wave B, in (i) a state in which the transmission wave A and the transmission wave B are simultaneously being outputted or (ii) a state in which only the transmission wave B is being outputted.

As illustrated in (a) of FIG. 7, in the case where the detecting object wave is the transmission wave A, only the transmission wave A is supplied from the transmission wave selection circuit 31 to the detection circuit 33. On the other hand, as illustrated in (b) of FIG. 7, in the case where the detecting object wave is the transmission wave B, only the transmission wave B is supplied from the transmission wave selection circuit 31 to the detection circuit 33.

(Configuration Example of Transmission Wave Selection Circuit)

Figure 2:
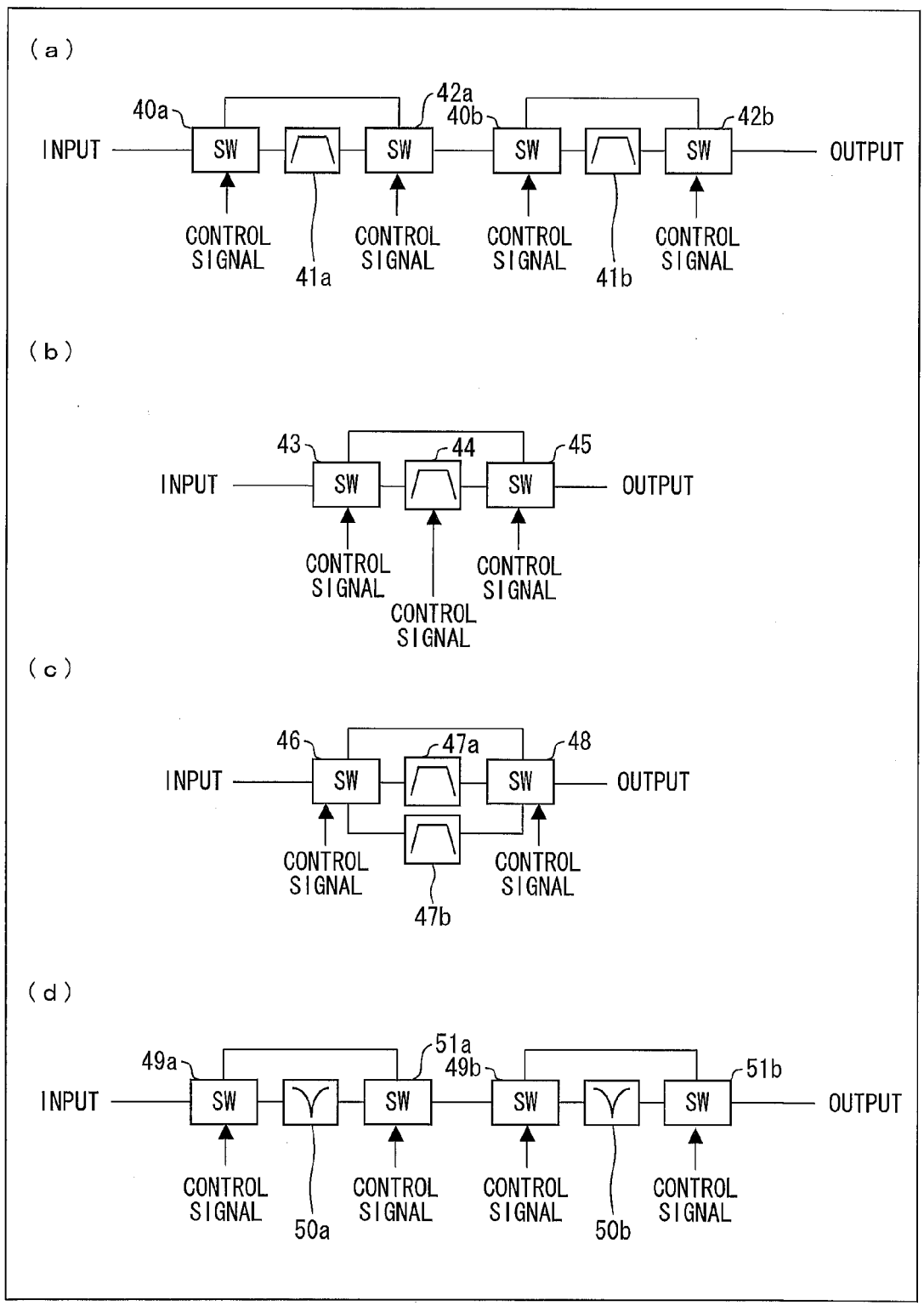
FIG. 2 is a block diagram illustrating examples of a configuration of a transmission wave selection circuit in accordance with an embodiment of the present invention.

FIG. 2 is a view illustrating a configuration example of the transmission wave selection circuit 31 in accordance with Embodiment 1. As illustrated in (a) through (d) of FIG. 2, the transmission wave selection circuit 31 of Embodiment 1 includes a filter. The transmission wave selection circuit 31 can further include a switch. Note that the configurations illustrated in (a) through (d) of FIG. 2 are illustrative only, and thus the present invention is not limited to these configurations.

(a) of FIG. 2 is a view illustrating a configuration example of the transmission wave selection circuit 31. For example, as illustrated in (a) of FIG. 2, the transmission wave selection circuit 31 is configured such that a band pass filter 41a through which the transmission wave A passes and a band pass filter 41b through which the transmission wave B passes are serially (in series) connected to each other. The band pass filter 41a is provided between the switches 40a and 42a, and the band pass filter 41b is provided between the switches 40b and 42b.

In a case where the detecting object wave is the transmission wave A, the control circuit 30 transmits (i) control signals to the respective switches 40a and 42a so that an input signal is supplied to the band pass filter 41a and (ii) control signals to the respective switches 40b and 42b so that an input signal bypasses (avoids) the band pass filter 41b. On the other hand, in a case where the detecting object wave is the transmission wave B, the control circuit 30 transmits (i) control signals to the respective switches 40a and 42a so that an input signal bypasses (avoids) the band pass filter 41a and (ii) control signals to the respective switches 40b and 42b so that an input signal is supplied to the band pass filter 41b. Note that in a state in which the transmission wave A and the transmission wave B are not simultaneously being outputted and only the detecting object wave is being outputted, the control circuit 30 can transmit control signals to the respective switches 40a, 40b, 42a, and 42b so that an input signal bypasses both of the band pass filters 41a and 41b.

In this manner, in the configuration example illustrated in (a) of FIG. 2, the transmission wave selection circuit 31 can selectively and successfully output the detecting object wave. Note that even in a case where three or more types of transmission waves are simultaneously outputted in another embodiment, it is only necessary in a manner similar to the above configuration example that (i) the same number of band pass filters as the number of types of transmission waves are connected to each other in serial and (ii) the same number of band pass filters are controlled so that an input signal is supplied to a band pass filter through which a detecting object wave passes.

(b) of FIG. 2 is a view illustrating another configuration example of the transmission wave selection circuit 31. For example, as illustrated in (b) of FIG. 2, the transmission wave selection circuit 31 is configured such that a variable band pass filter 44, whose passband is variable, is provided between switches 43 and 45. The variable band pass filter 44 is configured such that its passband can be switched between (i) a state in which the transmission wave A is passed through and (ii) a state in which the transmission wave B is passed through.

In a state in which the transmission wave A and the transmission wave B are simultaneously being outputted, the control circuit 30 transmits control signals to the respective switches 43 and 45 so that an input signal is supplied to the variable band pass filter 44. In a case where the detecting object wave is the transmission wave A, the control circuit 30 transmits a control signal to the band pass filter 44 so that the transmission wave A passes through the variable band pass filter 44, and in a case where the detecting object wave is the transmission wave B, the control circuit 30 transmits a control signal to the band pass filter 44 so that the transmission wave B passes through the variable band pass filter 44. On the other hand, in a state in which the transmission wave A and the transmission wave B are not simultaneously being outputted and only the detecting object wave is being outputted, the control circuit 30 transmits control signals to the respective switches 43 and 45 so that an input signal bypasses the variable band pass filter 44.

Note that it is possible to employ an alternative configuration in which (i) neither of the switches 43 and 45 is provided and (ii) the variable band pass filter 44 is controlled in accordance with the detecting object wave regardless of whether or not the transmission wave A and the transmission wave B are simultaneously outputted.

In this manner, in the configuration example illustrated in (b) of FIG. 2, the transmission wave selection circuit 31 can selectively and successfully output the detecting object wave. Note that, even in a case where three or more types of transmission waves are simultaneously outputted in another embodiment, it is only necessary, in a manner similar to the above configuration example, to (i) use a variable band pass filter whose passband is variable within a range of passbands corresponding to the respective three or more types of transmission waves and (ii) control the variable band pass filter in accordance with a detecting object wave.

(c) of FIG. 2 is a view illustrating still another selection circuit 31. For example, as illustrated in (c) of FIG. 2, the transmission wave selection circuit 31 is configured such that (i) a band pass filter 47a through which the transmission wave A passes and (ii) a band pass filter 47b through which the transmission wave B passes, are connected to each other in parallel. Whether an input signal (i) passes through the band pass filter 47a, (ii) passes through the band pass filter 47b, or (iii) bypasses both of the band pass filters 47a and 47b, is controlled in response to how the switches 46 and 48 are operated.

In a case where the detecting object wave is the transmission wave A, the control circuit 30 transmits control signals to the respective switches 46 and 48 so that an input signal is supplied to the band pass filter 47a. On the other hand, in a case where the detecting object wave is the transmission wave B, the control circuit 30 transmits control signals to the respective switches 46 and 48 so that an input signal is supplied to the band pass filter 47b. Note that in a state in which the transmission wave A and the transmission wave B are not simultaneously being outputted and only the detecting object wave is being outputted, the control circuit 30 can transmit control signals to the respective switches 46 and 48 so that an input signal bypasses both of the band pass filters 47a and 47b.

In this manner, in the configuration example illustrated in (c) of FIG. 2, the transmission wave selection circuit 31 can selectively and successfully output the detecting object wave. Note that even in a case where three or more types of transmission waves are simultaneously outputted in another embodiment, it is only necessary in a manner similar to the above configuration example that (i) the same number of band pass filters as the number of types of transmission waves are connected to each other in serial and (ii) the same number of band pass filters are controlled so that an input signal is supplied to a band pass filter through which a detecting object wave passes.

(d) of FIG. 2 is a view illustrating a further configuration example of the transmission wave selection circuit 31. For example, as illustrated in (d) of FIG. 2, the transmission wave selection circuit 31 is configured such that (i) a notch filter 50a which blocks the transmission wave A and (ii) a notch filter 50b which blocks the transmission wave B, are connected to each other in serial. The notch filter 50a is provided between switches 49a and 51a, and the notch filter 50b is provided between switches 49b and 51b.

In a case where the detecting object wave is the transmission wave A, the control circuit 30 transmits (i) control signals to the respective switches 49a and 51a so that an input signal bypasses the notch filter 50a and (ii) control signals to the respective switches 49b and 51b so that an input signal is supplied to the notch filter 50b. On the other hand, in a case where the detecting object wave is the transmission wave B, the control circuit 30 transmits (i) control signals to the respective switches 49a and 51a so that an input signal is supplied to the notch filter 50a and (ii) control signals to the respective switches 49b and 51b so that an input signal bypasses the notch filter 50b. Note that in a state in which the transmission wave A and the transmission wave B are not simultaneously being outputted and only the detecting object wave is being outputted, the control circuit 30 can transmit control signals to the respective switches 49a, 49b, 51a, and 51b so that an input signal bypasses both of the band pass filters 50a and 50b.

In this manner, in the configuration example illustrated in (d) of FIG. 2, the transmission wave selection circuit 31 can selectively and successfully output the detecting object wave. Note that even in a case where three or more types of transmission waves are simultaneously outputted in another embodiment, it is only necessary in a manner similar to the above configuration example that (i) the same number of notch filters as the number of types of transmission waves are connected to each other in serial and (ii) the same number of notch filters are controlled so that input signals are supplied to respective notch filters which block transmission waves other than a detecting object wave.

(Example of Control of Wireless Circuit)

Figure 8:
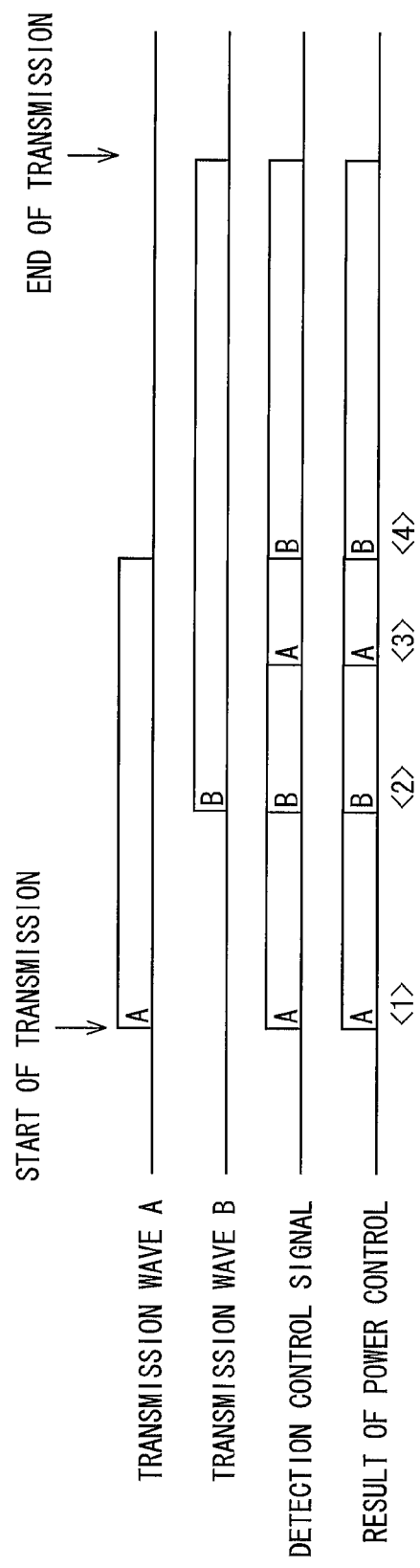
FIG. 8 is a view illustrating an example of a timing at which each transmission wave is detected in a wireless circuit in accordance with an embodiment of the present invention.

FIG. 8 is a view illustrating an example of a timing at which each transmission wave is detected in a wireless circuit 100. As illustrated in FIG. 8, when a transmission of a transmission wave starts, only a transmission wave A is first transmitted, and after a while, the transmission wave A and a transmission wave B are simultaneously transmitted. After a while, only the transmission wave B is transmitted, and after a while, the transmission of the transmission waves ends In this case, in a state in which only a transmission wave A is being transmitted, the control circuit 30 controls the transmission wave selection circuit 31 to detect a transmission power of the transmission wave A, for example. That is, the control circuit 30 transmits, to the transmission wave selection circuit 31, a control signal which specifies the transmission wave A as a detecting object wave. The operation section 34 then carries out feedback control (power control) with respect to the transmission power of the transmission wave A in accordance with the transmission power of the transmission wave A which transmission power has been detected by the detection circuit 33 (<1>).

In a state in which the transmission wave A and the transmission wave B are simultaneously being transmitted, the control circuit 30 switches the detecting object wave so that transmission powers of the respective transmission wave A and transmission wave B are detected, for example. That is, first, the control circuit 30 switches the detecting object between the transmission waves A and B and transmits, to the transmission wave selection circuit 31, a control signal which specifies the transmission wave B as the detecting object wave. The operation section 34 then carries out feedback control (power control) with respect to the transmission power of the transmission wave B in accordance with the transmission power of the transmission wave B which transmission power has been detected by the detection circuit 33 (<2>). Subsequently, the control circuit 30 switches the detecting object between the transmission waves A and B and transmits, to the transmission wave selection circuit 31, a control signal which specifies the transmission wave A as the detecting object wave. The operation section 34 then carries out feedback control (power control) with respect to the transmission power of the transmission wave A in accordance with the transmission power of the transmission wave A which transmission power has been detected by the detection circuit 33 (<3>).

In doing so, switching intervals, at which the control circuit 30 switches the detecting object wave between the transmission wave A and the transmission wave B, can be set as appropriate in accordance with a purpose of a user. This is because power consumption and the like, caused during the switching of the detecting object wave, should be taken into consideration, although detailed feedback control can be carried out with respect to the transmission power in a case where the switching intervals are short. Note that the transmission wave selection circuit 31 can, for example, maintain a previous state while no transmission power is detected.

In a state in which only a transmission wave B is being transmitted, the control circuit 30 controls the transmission wave selection circuit 31 to detect a transmission power of the transmission wave B, for example. That is, the control circuit 30 transmits, to the transmission wave selection circuit 31, a control signal which specifies the transmission wave B as the detecting object wave. The operation section 34 then carries out feedback control (power control) with respect to the transmission power of the transmission wave B in accordance with the transmission power of the transmission wave B which transmission power has been detected by the detection circuit 33 (<4>).

According to Embodiment 1, even in a state in which a plurality of transmission waves are simultaneously being transmitted, it is thus possible to carry out, for example, power control by individually detecting the plurality of transmission waves.

Figure 9:
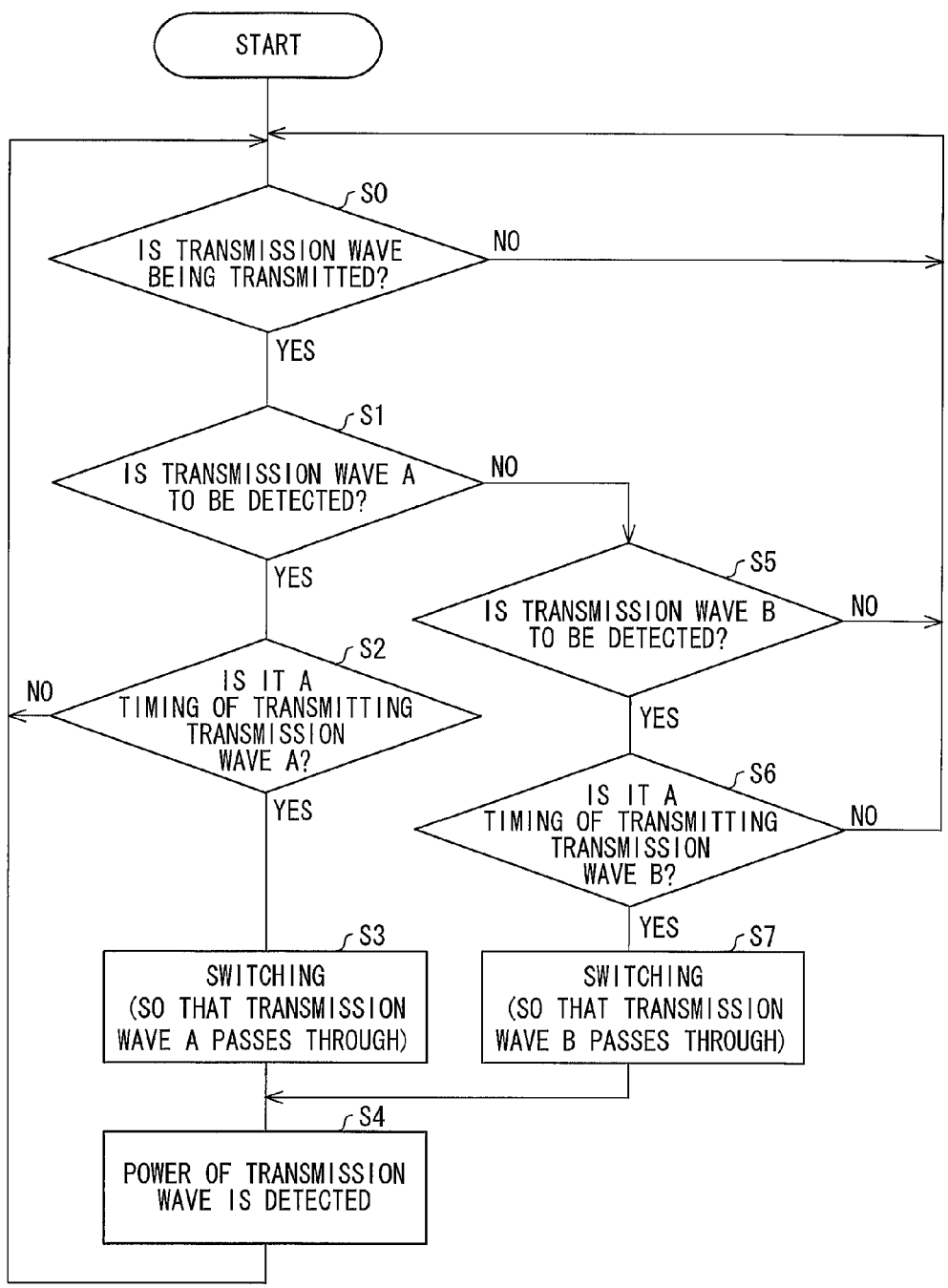
FIG. 9 is a flow chart illustrating an example flow of how a transmission wave is detected in a wireless circuit in accordance with an embodiment of the present invention.

FIG. 9 is a flow chart illustrating an example flow of how a transmission wave is detected in the wireless circuit 100. As illustrated in FIG. 9, the control circuit 30 first determines in Step S0 whether or not a transmission wave is being transmitted. In a case where a transmission wave is being transmitted, the process proceeds to Step S1. In a case where no transmission wave is being transmitted, Step S0 is repeated.

In Step S1, the control circuit 30 determines whether or not the transmission wave A is to be detected. As described above, the control circuit 30 can make this determination, for example, depending on (i) whether the wireless circuit 100 is in (a) a state in which only the transmission wave A is being transmitted; (b) a state in which only the transmission wave B is being transmitted; or (c) a state in which the transmission wave A and the transmission wave B are simultaneously being transmitted or (ii) switching intervals of the detecting object wave in the state (c). In a case where the transmission wave A is to be detected, the process proceeds to Step S2. Otherwise, the process proceeds to Step S5.

In Step S2, the control circuit 30 determines whether or not it is a timing of transmitting the transmission wave A. In a case where it is the timing of transmitting the transmission wave A, the process proceeds to Step S3. Otherwise, the process returns to Step S0.

In Step S3, the control circuit 30 transmits a control signal to the transmission wave selection circuit 31 so that the transmission wave A, which is a detecting object wave, is selectively outputted (allowed to pass through). The process then proceeds to Step S4.

In Step S4, the detection circuit 33 detects a power of the detecting object wave. The operation section 34 controls the transmission power with respect to the detecting object wave in accordance with the power of the detecting object wave detected by the detection circuit 33. Subsequently, the process returns to Step S0.

In Step S5, the control circuit 30 determines whether or not the transmission wave B is to be detected. The control circuit 30 can make this determination in a manner similar to that in Step S1. In a case where the transmission wave B is to be detected, the process proceeds to Step S6. Otherwise, the process returns to Step S0.

In Step S6, the control circuit 30 determines whether or not it is a timing of transmitting the transmission wave B. In a case where it is the timing of transmitting the transmission wave B, the process proceeds to Step S7. Otherwise, the process returns to Step S0.

In Step S7, the control circuit 30 transmits a control signal to the transmission wave selection circuit 31 so that the transmission wave B, which is the detecting object wave, is selectively outputted (allowed to pass through). The process then proceeds to Step S4.

(Variation)

Note that, according to a variation of Embodiment 1, the control circuit 30 and the operation section 34 can be provided for each transmission wave. For example, a transmission system for the transmission wave A and a transmission system for the transmission wave B can be provided in a different CPU (control unit).

In a case where transmission waves need to be detected in their respective transmission systems, (i) CPUs of the respective transmission systems transmit respective control signals as described above to the transmission wave selection circuit 31 and (ii) the CPUs of the respective transmission systems transmit each other signals indicating that the transmission waves are being detected. When the transmission waves have been detected, the CPUs of the transmission systems transmit each other respective signals indicating that the respective transmission waves have been detected.

In a case where (i) the CPU of one of the transmission systems has already transmitted, to the CPU of the other of the transmission systems, a signal indicating that the transmission wave of the one of the transmission systems is being detected and (ii) the transmission wave needs to be detected in the other of the transmission systems, the CPU of the other of the transmission systems (1) waits until the CPU of the one of the transmission systems transmits, to the CPU of the other of the transmission systems, a signal indicating that the transmission wave has been detected or (2) (a) transmits, to the CPU of the one of the transmission systems, a signal indicating that an interrupt handling for detecting the transmission wave is to be carried out and (b) transmits a control signal as has been described to the transmission wave selection circuit 31. Accordingly, even in a state in which a plurality of transmission waves are simultaneously being transmitted, it is thus possible in a manner similar to Embodiment 1 to carry out, for example, power control by individually detecting the plurality of transmission waves.

In another variation of Embodiment 1, circuits such as the control circuit 30 and the transmission wave selection circuit 31, can be incorporated into a chip or a module so that a matching constant is fixed. For example, the transmission wave generating circuit A10, the transmission wave generating circuit B20, the control circuit 30, the transmission wave selection circuit 31, the detection circuit 33, and the operation section 34 can be included in a single RFIC. This allows problems to be more suitably solved. Such problems encompass (i) an increased circuit scale, (ii) a problem with timing due to delay difference between wires, (iii) a crosstalk caused by parallel wires, and (iv) a necessity of matching adjustment caused by a change in layout.

Note that the above variations are also applicable to other embodiments described below.

Embodiment 2

The following description will discuss another embodiment (Embodiment 2) of the present invention with reference to the drawings. Note that, for convenience of description, members which have functions identical to those described in the above embodiment are given identical reference numerals, and descriptions on such members will be omitted.

Figure 3:
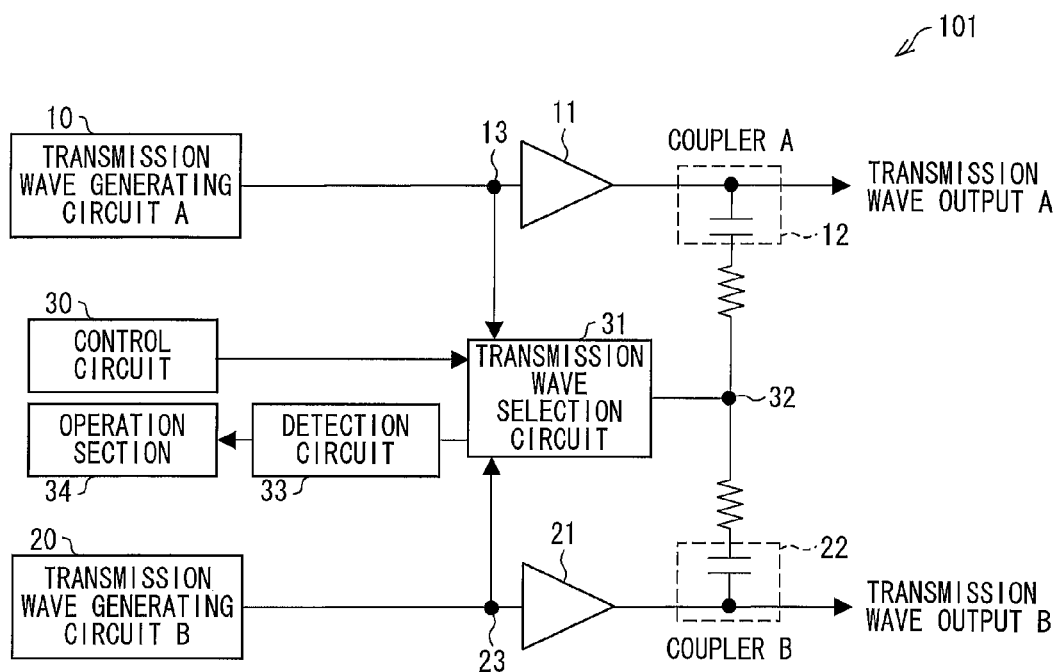
FIG. 3 is a block diagram illustrating a schematic configuration of a wireless circuit in accordance with an embodiment of the present invention.

FIG. 3 is a block diagram illustrating a schematic configuration of a wireless circuit 101 in accordance with Embodiment 2. As illustrated in FIG. 3, in the wireless circuit 101, a part of a transmission wave A generated by a transmission wave generating circuit A10 is taken out in a coupling section 13. The transmission wave A is then supplied to an amplifier A11. The part of the transmission wave A taken out in the coupling section 13 is supplied to a transmission wave selection circuit 31. Similarly, a part of a transmission wave B generated by a transmission wave generating circuit B20 is taken out in a coupling section 23. The transmission wave B is then supplied to an amplifier B21. The part of the transmission wave B taken out in the coupling section 23 is supplied to the transmission wave selection circuit 31.

The transmission wave selection circuit 31 generates, from the transmission wave A and the transmission wave B (the transmission wave A and the transmission wave B which have not been amplified by the amplifier A11 and the amplifier B21, respectively) which have been supplied via the coupling section 13 and the coupling section 23, respectively, a cancellation signal which cancels one of the transmission wave A and the transmission wave B which have been amplified by the amplifier A11 and the amplifier B21, respectively. The transmission wave selection circuit 31 selectively outputs a detecting object wave by adding the cancellation signal to the transmission wave A and the transmission wave B which have been coupled to each other in the coupling section 32.

(Configuration Example of Transmission Wave Selection Circuit)

Figure 4:
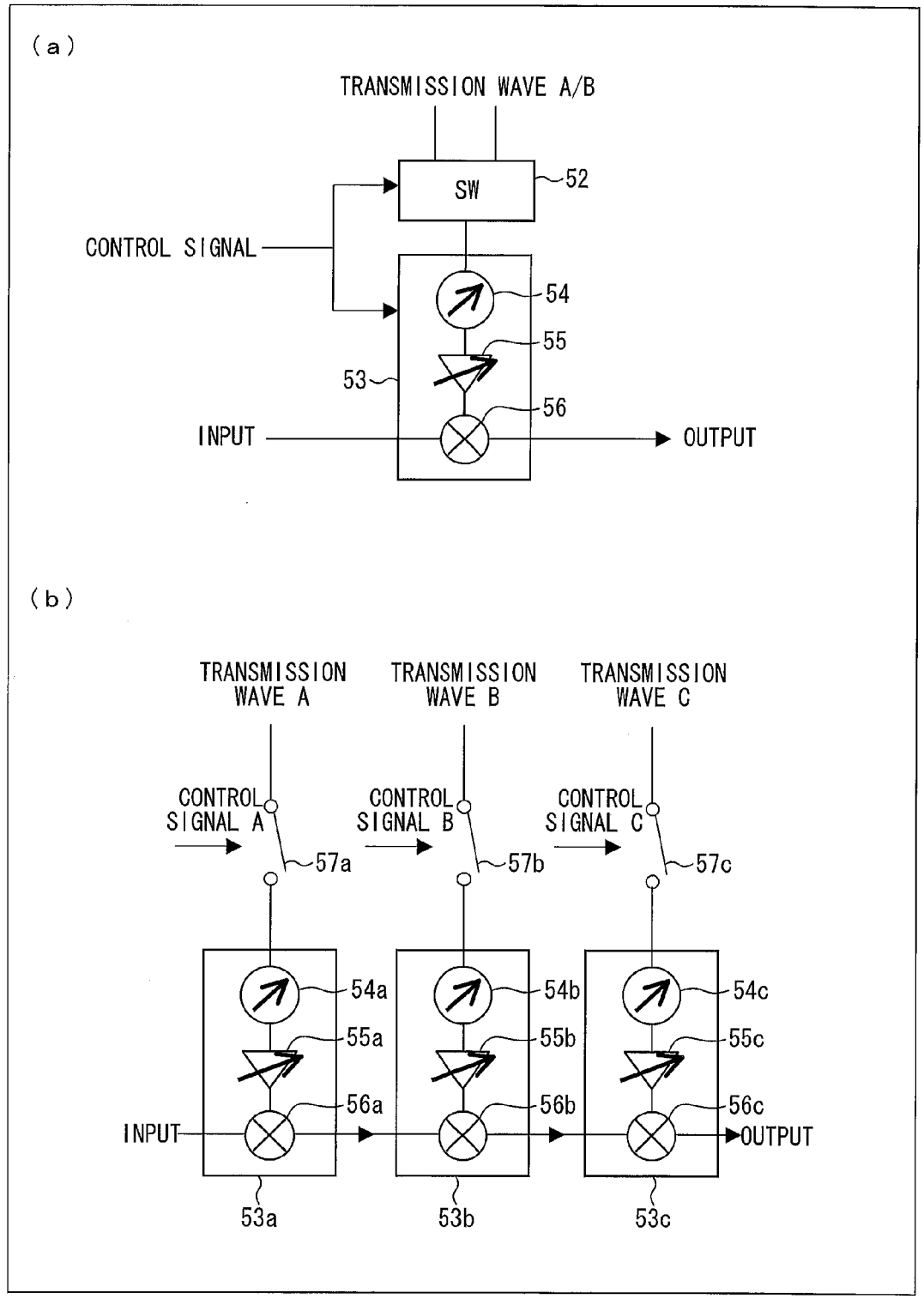
FIG. 4 is a block diagram illustrating examples of a configuration of a transmission wave selection circuit in accordance with an embodiment of the present invention.

FIG. 4 is a view illustrating a configuration example of a transmission wave selection circuit 31 in accordance with Embodiment 2. Note that configurations illustrated in (a) and (b) of FIG. 4 are illustrative only, and the present invention is not limited to these configurations.

(a) of FIG. 4 is a view illustrating a configuration example of the transmission wave selection circuit 31 in accordance with Embodiment 2. As illustrated, for example, in (a) of FIG. 4, the transmission wave selection circuit 31 includes a switch 52 that (i) receives the transmission wave A which has not been amplified by the amplifier A11 or the transmission wave B which has not been amplified by the amplifier B21 and (ii) selectively outputs one of the transmission wave A and the transmission wave B. The transmission wave selection circuit 31 further includes a cancellation circuit (cancellation signal generating section) 53 which selectively outputs the detecting object wave from an input signal (the transmission wave A amplified by the amplifier A11 and the transmission wave B amplified by the amplifier B21 are coupled to each other) by use of the transmission wave supplied from the switch 52.

The cancellation circuit 53 includes a phase shifter 54, an amplifier (attenuator) 55, and an adder 56. The cancellation circuit 53 is configured to (i) generate a cancellation signal which cancels (a) the transmission wave A which has been amplified by the amplifier A11 or (b) the transmission wave B which has been amplified by the amplifier B21, by adjusting a phase and an amplitude of the transmission wave A which has not been amplified by the amplifier A11 or a phase and an amplitude of the transmission wave B which has not been amplified by the amplifier B21 and (ii) add the cancellation signal to the input signal (the transmission wave A amplified by the amplifier A11 and the transmission wave B amplified by the amplifier B21 are coupled to each other) so as to cancel the transmission wave A or the transmission wave B in the input signal.

Note that no limitation is imposed on a phase, provided that the transmission waves A and B are adjusted so as to have opposite phases. An amount of phase shift for the adjustment can be calculated in advance on the basis of lengths of paths in the wireless circuit 101. Accordingly, an amount of phase shift of the phase shifter 54 can be set at the time of setting or production of the wireless circuit 101. Note, however, that the amount of the phase shift of the phase shifter 54 can be alternatively set during operation of the wireless circuit 101. No limitation is imposed on an amplitude of a transmission wave, provided that the transmission waves A and B are adjusted so as to have identical amplitudes. Since an amount of attenuation of each signal in the wireless circuit 101 is determined in accordance with a circuit configuration, an amount of amplification (attenuation) of the amplifier (attenuator) 55 can be set, during the setting or production of the wireless circuit 101, on the basis of (i) amplitudes of transmission signals which amplitudes are determined by the respective transmission wave generating circuits and (ii) an amount of attenuation of a signal which attenuation is determined in accordance with the circuit configuration. Note, however, that in order to make a detailed adjustment of the amplitude, the amplitude can be dynamically adjusted in consideration of an influence of an external factor such as a temperature.

In a case where the detecting object wave is the transmission wave A, the control circuit 30 transmits a control signal to the switch 52 so that a transmission wave (transmission wave B) other than the detecting object wave is supplied to the cancellation circuit 53, and the control circuit 30 transmits a control signal to the cancellation circuit 53 so that the transmission wave (transmission wave B) other than the detecting object wave in the input signal is cancelled. On the other hand, in a case where the detecting object wave is the transmission wave B, the control circuit 30 transmits a control signal to the switch 52 so that a transmission wave (transmission wave A) other than the detecting object wave is supplied to the cancellation circuit 53, and the control circuit 30 transmits a control signal to the cancellation circuit 53 so that the transmission wave (transmission wave A) other than the detecting object wave in the input signal is cancelled. Note that, in a state in which the transmission wave A and the transmission wave B are not simultaneously being outputted and only the detecting object wave is being outputted, the control circuit 30 can transmit a control signal to the cancellation circuit 53 so that no signal is added to the input signal by the adder 56.

In this manner, in the configuration example illustrated in (a) of FIG. 4, the transmission wave selection circuit 31 can selectively and successfully output the detecting object wave.

Note that Embodiment 2 is not limited to a case where two types of transmission waves are dealt with, and can therefore be also applied to a case where three or more types of transmission waves are dealt with. (b) of FIG. 4 is a view illustrating, in a variation, a configuration example of the transmission wave selection circuit 31 employed in a case where three types of transmission waves (transmission wave A, transmission wave B, and transmission wave C) are dealt with.

As illustrated, for example, in (b) of FIG. 4, the transmission wave selection circuit 31 is configured such that a cancellation circuit 53a for cancelling a transmission signal A, a cancellation circuit 53b for cancelling a transmission signal B, and a cancellation circuit 53c for cancelling a transmission signal C are connected to each other in serial.

A transmission wave A, which has not been amplified by an amplifier, is supplied to the cancellation circuit 53a via a switch 57a. A transmission wave B, which has not been amplified by an amplifier, is supplied to the cancellation circuit 53b via a switch 57b. A transmission wave C, which has not been amplified by an amplifier, is supplied to the cancellation circuit 53c via a switch 57c.

The cancellation circuit 53a includes a phase shifter 54a, an amplifier (attenuator) 55a, and an adder 56a. The cancellation circuit 53b includes a phase shifter 54b, an amplifier (attenuator) 55b, and an adder 56b. The cancellation circuit 53c includes a phase shifter 54c, an amplifier (attenuator) 55c, and an adder 56c. The cancellation circuits 53a, 53b, and 53c are each configured to (i) generate a cancellation signal which cancels the transmission wave A amplified by the amplifier 55a, the transmission wave B amplified by the amplifier 55b, or the transmission wave C amplified by the amplifier 55c, by adjusting (a) a phase and an amplitude of the transmission wave A which has not been amplified by the amplifier 55a, (b) a phase and an amplitude of the transmission wave B which has not been amplified by amplifier 55b, or (c) a phase and an amplitude of the transmission wave C which has not been amplified by the amplifier 55c and (ii) add the cancellation signal to an input signal so as to cancel the transmission waves A, B, or C in the input signal.

In a case where the detecting object wave is the transmission wave A, the control circuit 30 transmits control signals to the respective switches 57b and 57c so that transmission waves (transmission waves B and C) other than the detecting object wave are supplied to the respective cancellation circuits 53b and 53c. The control circuit 30 further transmits control signals to the respective cancellation circuits 53b and 53c so that the transmission waves (transmission waves B and C) other than the detecting object wave in the input signal are canceled. In a case where the detecting object wave is the transmission wave B, the control circuit 30 transmits control signals to the respective switches 57a and 57c so that transmission waves (transmission waves A and C) other than the detecting object wave are supplied to the respective cancellation circuits 53a and 53c. The control circuit 30 further transmits control signals to the respective cancellation circuits 53a and 53c so that the transmission waves (transmission waves A and C) other than the detecting object wave in the input signal are canceled. In a case where the detecting object wave is the transmission wave C, the control circuit 30 transmits control signals to the respective switches 57a and 57b so that transmission waves (transmission waves A and B) other than the detecting object wave are supplied to the respective cancellation circuits 53a and 53b. The control circuit 30 further transmits control signals to the respective cancellation circuits 53a and 53b so that the transmission waves (transmission waves A and B) other than the detecting object wave in the input signal are canceled. Note that in a state in which the transmission waves A, B, and C are not simultaneously being outputted and only the detecting object wave is being outputted, the control circuit 30 can transmit control signals to the respective cancellation circuits 53a, 53b, and 53c so that no signal is added to the input signal.

In this manner, in the configuration example illustrated in (b) of FIG. 4, the transmission wave selection circuit 31 can selectively and successfully output the detecting object wave. Note that even in a case where four or more types of transmission waves are simultaneously outputted in another embodiment, it is only necessary in a manner similar to the above configuration example that (i) the same number of cancellation circuits as the number of types of transmission waves are connected to each other in serial and (ii) the same number of cancellation circuits are controlled so that transmission waves other than a detecting object wave are cancelled.

(Example of Control of Wireless Circuit)

Figure 10:
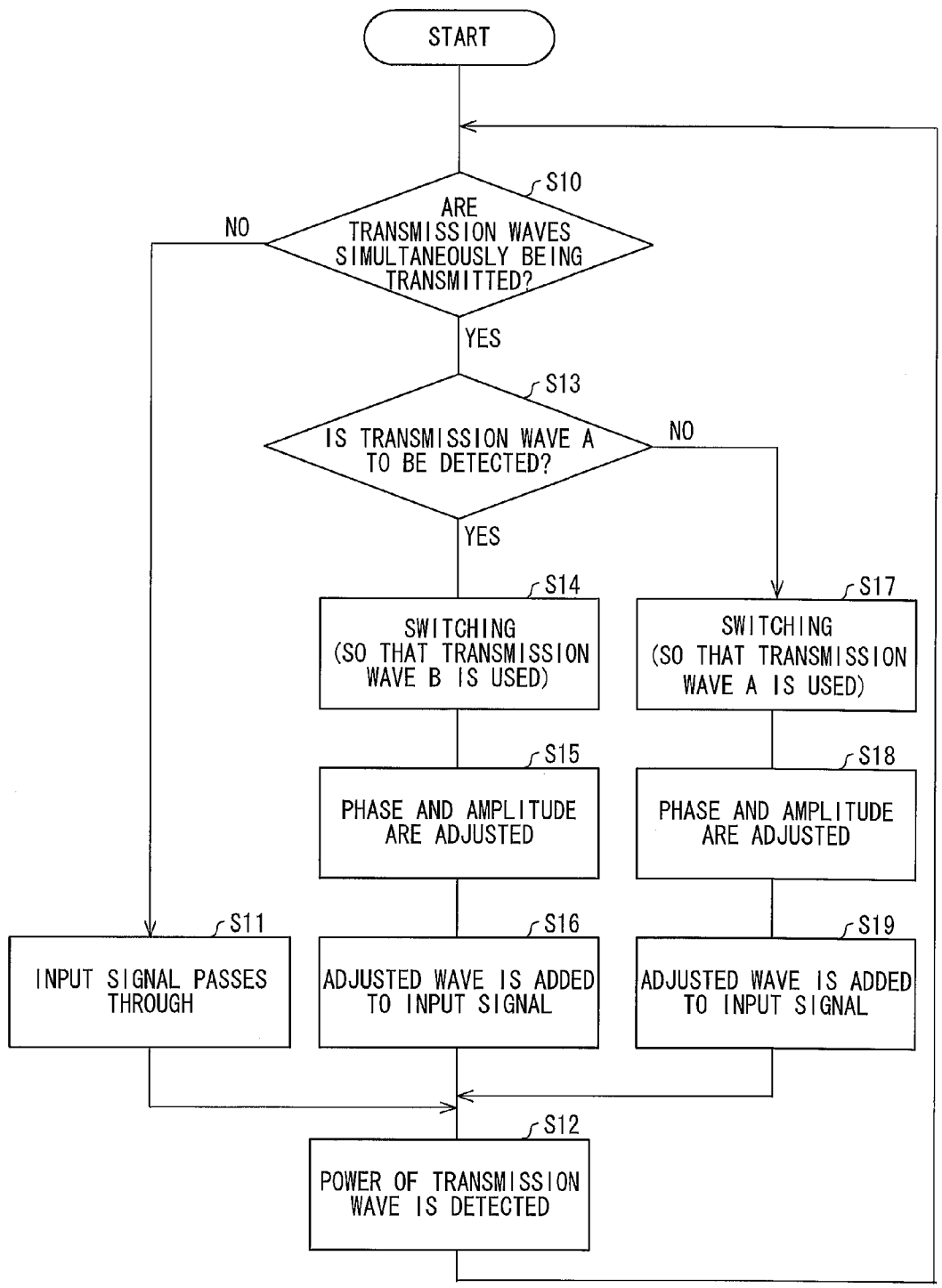
FIG. 10 is a flow chart illustrating an example flow of how a transmission wave is detected in a wireless circuit in accordance with an embodiment of the present invention.

FIG. 10 is a flow chart illustrating an example flow of how a transmission wave is detected in the wireless circuit 101. As illustrated in FIG. 10, the control circuit 30 first determines in Step S10 whether or not transmission waves are simultaneously being transmitted. In a case where the transmission waves are not simultaneously being transmitted (in a case where only a detecting object wave is being transmitted), the process proceeds to Step S11. In a case where transmission waves are not simultaneously being transmitted, the process proceeds to Step S13.

In Step S11, the control circuit 30 transmits a control signal to the transmission wave selection circuit 31 so that the transmission wave selection circuit 31 (i) adds no signal to an input signal and allows the input signal to pass through. The process then proceeds to Step S12.

In Step S12, the detection circuit 33 detects a power of the detecting object wave. The operation section 34 controls a transmission power of the detecting object wave in accordance with the power of the detecting object wave detected by the detection circuit 33. The process then returns to Step S10.

In Step S13, the control circuit 30 determines whether or not the transmission wave A is to be detected. As described above, the control circuit 30 can make this determination, for example, depending on (i) whether the wireless circuit 101 is in (a) a state in which only the transmission wave A is being transmitted; (b) a state in which only the transmission wave B is being transmitted; or (c) a state in which the transmission wave A and the transmission wave B are simultaneously being transmitted or switching intervals of the detecting object wave in the state (c). In a case where the transmission wave A is to be detected, the process proceeds to Step S14. Otherwise (in a case where the transmission wave B is to be detected), the process proceeds to Step S17.

In Step S14, the control circuit 30 transmits a control signal to the switch 52 so that the transmission wave B, which has not been amplified by the amplifier B21, is supplied to the cancellation circuit 53. The process then proceeds to Step S15.

In Step S15, (i) the phase shifter 54 and (ii) the amplifier (attenuator) 55 of the cancellation circuit 53 adjust a phase and an amplitude of the transmission wave B which has not been amplified by the amplifier B21. The cancellation circuit 53 then generates a cancellation signal for cancelling the transmission wave B which has been amplified by the amplifier B21. The process then proceeds to Step S16.

In Step S16, the transmission wave selection circuit 31 (i) cancels the transmission wave B included in the input signal by adding, to the input signal, the cancellation signal generated by the cancellation circuit 53 in Step S15 and (ii) selectively outputs only the transmission wave A, which is the detecting object wave. The process then proceeds to Step S12.

In Step S17, the control circuit 30 transmits a control signal to the switch 52 so that the transmission wave A, which has not been amplified by the amplifier A11, is supplied to the cancellation circuit 53. The process then proceeds to Step S18.

In Step S18, (i) the phase shifter 54 and (ii) the amplifier (attenuator) 55 of the cancellation circuit 53 adjust a phase and an amplitude of the transmission wave A which has not been amplified by the amplifier A11. The cancellation circuit 53 then generates a cancellation signal for cancelling the transmission wave A which has been amplified by the amplifier A11. The process then proceeds to Step S19.

In Step S19, the transmission wave selection circuit 31 (i) cancels the transmission wave A included in the input signal by adding, to the input signal, the cancellation signal generated by the cancellation circuit 53 in Step S18 and (ii) selectively outputs only the transmission wave B, which is the detecting object wave. The process then proceeds to Step S12.

Embodiment 3

The following description will discuss still another embodiment (Embodiment 3) of the present invention with reference to the drawings. Note that, for convenience of description, members which have functions identical to those described in the above embodiments are given identical reference numerals, and descriptions on such members will be omitted.

Figure 5:
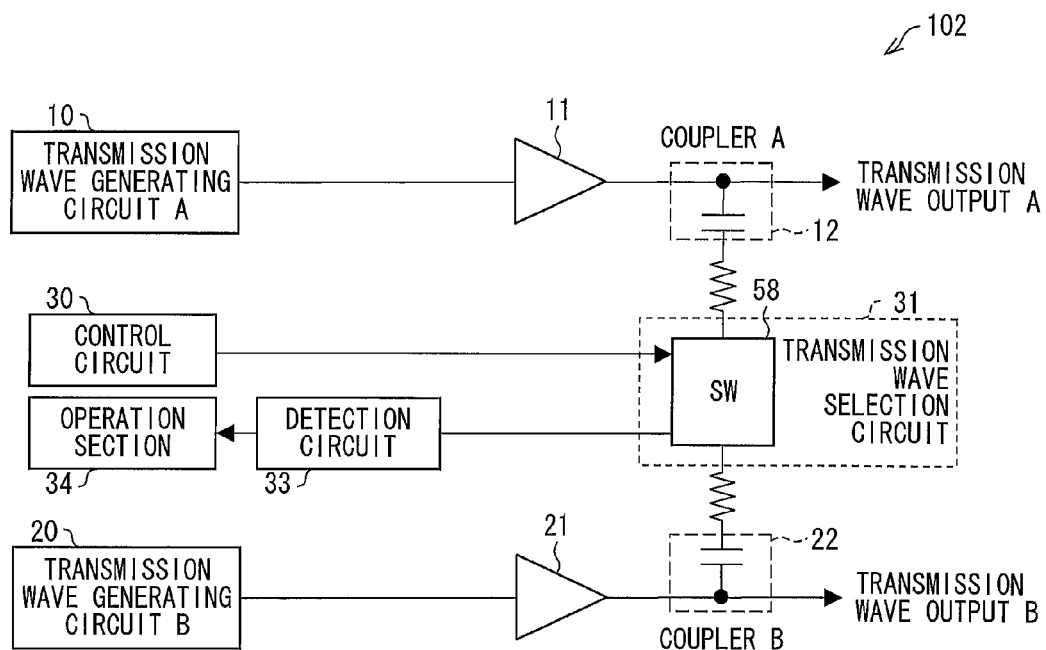
FIG. 5 is a block diagram illustrating a schematic configuration of a wireless circuit in accordance with an embodiment of the present invention.

FIG. 5 is a block diagram illustrating a schematic configuration of a wireless circuit 102 in accordance with Embodiment 3. As illustrated in FIG. 5, in the wireless circuit 102, a transmission wave A generated by a transmission wave generating circuit A10 is amplified by an amplifier A11, and a part of the transmission wave A is taken out by a coupler A12. The transmission wave A is then outputted (transmission wave output A). On the other hand, a transmission wave B generated by a transmission wave generating circuit B20 is amplified by an amplifier B21, and a part of the transmission wave B is taken out by a coupler B22. The transmission wave B is then outputted (transmission wave output B). The part of the transmission wave A which has been taken out by the coupler A12 and the transmission wave B which has been taken out by the coupler B22 are both supplied to a switch 58 of a transmission wave selection circuit 31.

In response to a control signal supplied from a control circuit 30, the switch 58 supplies, to a detection circuit 33, a detecting object wave out of the transmission wave A and the transmission wave B thus supplied. This also allows the transmission wave selection circuit 31 of Embodiment 3 to selectively and successfully output the detecting object wave.

Embodiment 4

The following description will discuss a further embodiment (Embodiment 4) of the present invention with reference to the drawings. Note that, for convenience of description, members which have functions identical to those described in the above embodiments are given identical reference numerals, and descriptions on such members will be omitted.

Figure 6:
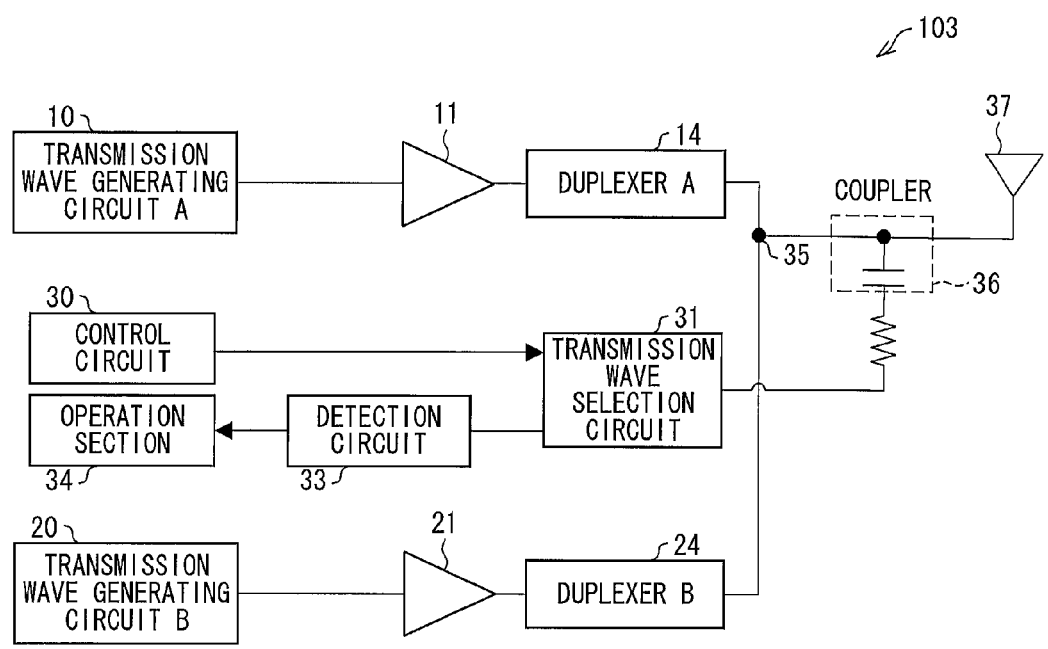
FIG. 6 is a block diagram illustrating a schematic configuration of a wireless circuit in accordance with an embodiment of the present invention.

FIG. 6 is a block diagram illustrating a schematic configuration of a wireless circuit 103 in accordance with Embodiment 4. As illustrated in FIG. 6, in the wireless circuit 103, a transmission wave A generated by a transmission wave generating circuit A10 is amplified by an amplifier A11 and is then supplied to a duplexer A14. Similarly, a transmission wave B generated by a transmission wave generating circuit B20 is amplified by an amplifier B21 and is then supplied to a duplexer B24. The transmission wave A outputted from the duplexer A14 and the transmission wave B outputted from the duplexer B24 are coupled to each other in a coupling section 35 so as to generate a coupled transmission wave. A part of the coupled transmission wave is taken out by a coupler 36. The coupled transmission wave is then outputted from an antenna 37. The part of the coupled transmission wave which has been taken out by the coupler 36 is then supplied to a transmission wave selection circuit 31.

In response to a control signal supplied from a control circuit 30, the transmission wave selection circuit 31 supplies, to a detection circuit 33, a detecting object wave out of the transmission wave A and the transmission wave B thus supplied. This also allows the transmission wave selection circuit 31 of Embodiment 4 to selectively and successfully output the detecting object wave.

Note that Embodiment 2 can be combined with Embodiment 4. That is, in Embodiment 4, it is possible in a manner similar to Embodiment 2 to employ a configuration in which (i) the transmission wave A, which has not been amplified by the amplifier A11, and the transmission wave B, which has not been amplified by the amplifier B21, are supplied to the transmission wave selection circuit 31 and (ii) the transmission wave selection circuit 31 includes the switch 52 and the cancellation circuit 53.

[Conclusion]

A wireless circuit (wireless circuits 100 through 103) in accordance with an aspect of the present invention is a wireless circuit which is capable of simultaneously outputting a plurality of transmission signals, including: a determination section (control circuit 30) which determines, out of a plurality of transmission signals (transmission waves) that are simultaneously outputted by the wireless circuit (wireless circuits 100 through 103), a detecting object signal (detecting object wave) whose transmission power is to be detected; a selection section (transmission wave selection circuit 31) to which the plurality of transmission signals are supplied and which selectively outputs the detecting object signal (detecting object wave) determined by the determination section (control circuit 30); and a detection section (detection circuit 33) which detects a power of the detecting object signal (detecting object wave) which has been outputted by the selection section (transmission wave selection circuit 31).

With the configuration, the selection section selectively outputs, out of a plurality of transmission signals simultaneously transmitted, a detecting object signal whose transmission power is to be detected, and the detection section detects the detecting object signal outputted by the selection section. Accordingly, it is possible to individually detect powers of a respective plurality of transmission signals without providing a detection section for each frequency band. That is, with the configuration, it is possible to provide a wireless circuit which (i) has a compact configuration and (ii) is capable of individually detecting powers of respective transmission signals which are simultaneously generated by a respective plurality of transmission circuits.

The wireless circuit (wireless circuits 100 through 103) can be configured to further include: a plurality of transmission signal generating sections (transmission wave generating circuit A10 and transmission wave generating circuit B20) which generate the respective plurality of transmission signals (transmission wave A and transmission wave B); and a plurality of amplification sections (amplifier A11 and amplifier B21) which amplify the plurality of transmission signals (transmission wave A and transmission wave B) generated by the respective plurality of transmission signal generating sections (transmission wave generating circuit A10 and transmission wave generating circuit B20), the plurality of transmission signals (transmission wave A and transmission wave B), which have been amplified by the respective plurality of amplification sections (amplifier A11 and amplifier B21), being supplied to the selection section (transmission wave selection circuit 31).

With the configuration, powers of a transmission signals which have been amplified by the respective amplification sections can be detected. Note that, typically, the transmission signals which have been amplified by the respective amplification sections are mainly outputted from the wireless circuit and are then transmitted. Accordingly, transmission signals supplied to the selection section are some of the transmission signals which have been amplified by the amplification sections.

The wireless circuit (wireless circuit 101) can be configured such that the plurality of transmission signals (transmission wave A and transmission wave B) are supplied to the selection section (transmission wave selection circuit 31) while being coupled to each other; the selection section (transmission wave selection circuit 31) includes a cancellation signal generating section (cancellation circuits 53 and 53a through 53c) that generates, from the plurality of transmission signals (transmission wave A and transmission wave B) which have not been amplified by the respective plurality of amplification sections (amplifier A11 and amplifier B21), a cancellation signal which cancels each of the plurality of transmission signals (transmission wave A and transmission wave B); and the selection section (transmission wave selection circuit 31) selectively outputs the detecting object signal (detecting object wave), by adding, to the plurality of transmission signals (transmission wave A and transmission wave B) which have been supplied to the selection section (transmission wave selection circuit 31) while being coupled to each other, the cancellation signal which (i) has been generated by the cancellation signal generating section (cancellation circuits 53 and 53a through 53c) and cancels a transmission signal which differs from the detecting object signal (detecting object wave).

A wave form of a transmission signal, which has not been amplified by the amplification section, does not change after the transmission signal is amplified by the amplification section. Accordingly, it is possible to generate a cancellation signal that cancels the transmission signal amplified by the amplification section, by adjusting an amplitude and a phase of the transmission signal which has not been amplified by the amplification section. With the configuration, therefore, the cancellation signal generating section can generate a cancellation signal which cancels a transmission signal which differs from a detecting object signal. When the cancellation signal is added to an input signal in which a plurality of transmission signals which have been amplified by the amplification sections are coupled to each other, a detecting object signal which has been amplified by the amplification section can be selectively outputted.

The wireless circuit (wireless circuit 101) can be configured such that the cancellation signal generating section (cancellation circuits 53 and 53a through 53c) includes a phase shifter (phase shifter 54) and at least one of an amplifier and an attenuator (amplifier (attenuator) 55).

With the configuration, the cancellation signal generating section includes the phase shifter and at least one of the amplifier and the attenuator. This enables to easily adjust an amplitude and a phase of the transmission signal which has not been amplified by the amplification section, so that the cancellation signal can be successfully generated.

The wireless circuit (wireless circuits 100 and 103) can be configured such that (i) the plurality of transmission signals (transmission wave A and transmission wave B) are supplied to the selection section (transmission wave selection circuit 31) while being coupled to each other and (ii) the selection section (transmission wave selection circuit 31) includes a filter (band pass filters 41a, 41b, 47a, and 47b, variable band pass filter 44, and notch filters 50a and 50b) which selectively (a) allows each of the plurality of transmission signals (transmission wave A and transmission wave B) to pass through or (b) blocks each of the plurality of transmission signals.

With the configuration, the selection section can use a filter which selectively (i) allows each of a plurality of transmission signals to pass through or (ii) blocks each of a plurality of transmission signals so as to selectively output only a detecting object signal from an input signal in which a plurality of transmission signals are coupled to each other.

The wireless circuit (wireless circuits 100 through 103) can be configured such that the determination section (control circuit 30) switches the detecting object signal (detecting object wave) so that transmission powers of the respective plurality of transmission signals (transmission wave A and transmission wave B) are detected.

With the configuration, the determination section switches a detecting object signal so that transmission powers of a respective plurality of transmission signals simultaneously transmitted are detected (e.g., the determination section causes each of a plurality of transmission signals to be a detecting object signal in turn). This enables to detect the transmission powers of the respective plurality of transmission signals.

A wireless device in accordance with an aspect of the present invention is configured to include the wireless circuit (wireless circuits 100 through 103) in accordance with an aspect of the present invention.

With the configuration, the wireless device includes the wireless circuit, and thus it is possible to provide a wireless device which (i) has a compact configuration and (ii) is capable of individually detecting powers of respective transmission signals which are simultaneously generated by a respective plurality of transmission circuits.

A method of controlling a wireless circuit in accordance with an aspect of the present invention is a method of controlling a wireless circuit (wireless circuits 100 through 103)

which (i) includes a selection section (transmission wave selection circuit 31) and (ii) is capable of simultaneously outputting a plurality of transmission signals (transmission wave A and transmission wave B), including the steps of: (a) causing the wireless circuit (wireless circuits 100 through 103) to simultaneously output a plurality of transmission signals (transmission wave A and transmission wave B); (b) determining, out of the plurality of transmission signals (transmission wave A and transmission wave B), a detecting object signal (detecting object wave) whose transmission power is to be detected; (c) causing the selection section (transmission wave selection circuit 31) to selectively outputting, from an input including the plurality of transmission signals (transmission wave A and transmission wave B) the detecting object signal (detecting object wave) determined in the step (b); and (d) detecting a power of the detecting object signal (detecting object wave) outputted by the selection section (transmission wave selection circuit 31) in the step (c).

The above method brings about an effect equivalent to that of a wireless circuit in accordance with an aspect of the present invention.

[Software Implementation Example]

Finally, each block of the wireless circuits 100 through 103, particularly, the control circuit 30 can be implemented by hardware such as a logic circuit provided in an integrated circuit (IC chip) or can be implemented by software with the use of a CPU (Central Processing Unit).

In the latter case, the wireless circuits 100 through 103 include CPU that executes an instruction of a program that realizes respective functions; a ROM (Read Only Memory) that stores the program, a RAM (Random Access Memory) in which the program is loaded, and a storage device (storage medium) such as a memory that stores the program and various kinds of data. The object of the present invention can be also attained by supplying, to the wireless circuits 100 through 103, a storage medium, in which a program code (execute form program, intermediate code program, source program) for a control program, i.e., software that realizes the above-mentioned functions, of the wireless circuits 100 through 103, is stored readably by a computer, and by reading and executing the program code stored in the storage medium by the computer (or CPU or MPU).

The storage medium may use a non-transitory tangible medium, for example, any of tapes, such as a magnetic tape and a cassette tape; any of disks including magnetic disks, such as a Floppy (registered trademark) disk and a hard disk, and optical disks, such as a CD-ROM, an MO, an MD, a DVD, and a CD-R; any of cards, such as an IC card (including a memory card) and an optical card; any of semiconductor memories, such as a mask ROM, an EPROM, an EEPROM (registered trademark), and a flash ROM; or any of logic circuits, such as a PLD (Programmable Logic Device) and a FPGA (Field Programmable Gate Array).

The wireless circuits 100 through 103 may be configured to be connectable to a communication network, and the program code may be supplied via the communication network. This communication network is not particularly limited as long as the communication network can transmit the program code. For example, the Internet, an intranet, an extranet, a LAN, an ISDN, a VAN, a CATV communication network, a virtual private network, a telephone line network, a mobile communication network, or a satellite communication network may be used. A transmission medium forming the communication network is only required to transmit the program code, and hence is not limited to a specific configuration or a specific type. For example, the transmission medium may be a wired configuration, such as IEEE1394, a USB, a power-line carrier, a cable TV line, a telephone line, or ADSL (Asymmetric Digital Subscriber Line) line; or a wireless configuration, such as an infrared ray (e.g., IrDA or remote control), Bluetooth (registered trademark), IEEE802.11 radio, HDR (High Data Rate), NFC (Near Field Communication), DLNA (Digital Living Network Alliance), a mobile phone network, a satellite line, or a terrestrial digital network. The present invention may be implemented in a form of a computer data signal which is embedded in a carrier wave and in which the program code is implemented by electronic transmission.

The present invention is not limited to the description of the embodiments above, but may be altered by a skilled person in the art within the scope of the claims. An embodiment based on a proper combination of technical means disclosed in different embodiments is encompassed in the technical scope of the present invention. Moreover, a new technical feature can be obtained from a proper combination of technical means disclosed in different embodiments.

INDUSTRIAL APPLICABILITY

The present invention is applicable in a field of producing a wireless communication device.

REFERENCE SIGNS LIST

10: Transmission wave generating circuit A (transmission signal generating section)
11: Amplifier A (amplification section)
12: Coupler A
20: Transmission wave generating circuit B (transmission signal generating section)
21: Amplifier B (amplification section)
22: Coupler B
30: Control circuit (determination section)
31: Transmission wave selection circuit (selection section)
32, 35: Coupling section
33: Detection circuit (detection section)
34: Operation section
36: Coupler
37: Antenna
40*a*, 40*b*, 42*a*, 42*b*, 43, 45, 46, 48, 49*a*, 49*b*, 51*a*, 51*b*, 52, 57*a*, 57*b*, and 57*c*: Switch
41*a*, 41*b*, 47*a*, 47*b*: Band pass filter
44: Variable band pass filter
50*a*, 50*b*: Notch filter
53: Cancellation circuit (cancellation signal generating section)
54: Phase shifter
55: Amplifier (attenuator)
56: Adder
100 through 102: Wireless circuit

The invention claimed is:

1. A wireless circuit which is capable of simultaneously outputting a plurality of transmission signals, comprising:
   a determination section which determines, out of a plurality of transmission signals that are simultaneously outputted by the wireless circuit, a detecting object signal whose transmission power is to be detected;
   a selection section to which the plurality of transmission signals are supplied and which selectively outputs the detecting object signal determined by the determination section; and
   a detection section which detects a power of the detecting object signal which has been outputted by the selection section, the plurality of transmission signals are supplied to the selection section while being coupled to each other;

the selection section including a cancellation signal generating section that generates, from the plurality of transmission signals, a cancellation signal which cancels each of the plurality of transmission signals, the selection section selectively outputting the detecting object signal, by adding, to the plurality of transmission signals which have been supplied to the selection section while being coupled to each other, the cancellation signal which (i) has been generated by the cancellation signal generating section and (ii) cancels a transmission signal which differs from the detecting object signal.

2. A wireless circuit as set forth in claim 1, further comprising:

a plurality of transmission signal generating sections which generate the respective plurality of transmission signals; and a plurality of amplification sections which amplify the plurality of transmission signals generated by the respective plurality of transmission signal generating sections, the plurality of transmission signals, which have been amplified by the respective plurality of amplification sections, being supplied to the selection section.

3. The wireless circuit as set forth in claim 2, wherein the cancellation signal generating section generates, from the plurality of transmission signals which have not been amplified by the respective plurality of amplification sections, a cancellation signal which cancels each of the plurality of transmission signals.

4. The wireless circuit as set forth in claim 3, wherein the cancellation signal generating section includes a phase shifter and at least one of an amplifier and an attenuator.

5. The wireless circuit as set forth in claim 1, wherein the determination section switches the detecting object signal so that transmission powers of the respective plurality of transmission signals are detected.

* * * * *